United States Patent
Conti

(10) Patent No.: US 6,962,242 B2
(45) Date of Patent: Nov. 8, 2005

(54) BRAKE ROTOR

(75) Inventor: Roberto Conti, Olglate Olona (IT)

(73) Assignee: Meritor Heavy Vehicle Systems Cameria SpA, (IT)

( * ) Notice: Subject to any disclaimer, the term of this patent is extended or adjusted under 35 U.S.C. 154(b) by 26 days.

(21) Appl. No.: 10/622,091

(22) Filed: Jul. 17, 2003

(65) Prior Publication Data

US 2004/0074717 A1 Apr. 22, 2004

(30) Foreign Application Priority Data

Jul. 18, 2002 (GB) .................................. 0216749

(51) Int. Cl.⁷ .............................................. F16D 55/00
(52) U.S. Cl. .............. 188/71.1; 188/71.6; 188/264 AA
(58) Field of Search .............................. 188/71.1, 71.6, 188/73.2, 58, 264 A, 264 AA, 264 B; 192/107 R, 192/113.22, 113.23, 113.36; 301/6.8

(56) References Cited

U.S. PATENT DOCUMENTS

| 4,811,822 A | 3/1989 | Estaque |
| 6,110,303 A | 8/2000 | Takahashi et al. |
| 6,446,770 B2 * | 9/2002 | Qian et al. ............ 188/218 XL |
| 6,796,405 B2 * | 9/2004 | Ruiz ......................... 188/71.6 |
| 2001/0032758 A1 | 10/2001 | Ruiz |
| 2001/0040077 A1 | 11/2001 | Qian et al. |

FOREIGN PATENT DOCUMENTS

| JP | 57208331 | 12/1982 |
| JP | 2000240695 | 9/2000 |
| JP | 2001-165212 | 6/2001 |
| JP | 2001165215 | 6/2001 |

* cited by examiner

Primary Examiner—Pam Rodriguez
(74) Attorney, Agent, or Firm—Carlson, Gaskey & Olds

(57) ABSTRACT

A brake rotor having an annular disc connected to an annular mounting flange, the mounting flange defining a radially inner flange wall and including a plurality of circumferentially spaced mounting holes, in which the flange wall includes a plurality of recesses, with each recess situated circumferentially between adjacent mounting holes in which the brake rotor includes ventilation vanes between opposing braking faces of the annular disc with at least some ventilation vanes including inner vane portions which extend inwardly of a radially inner edge of the annular disc.

18 Claims, 3 Drawing Sheets

BRAKE ROTOR

REFERENCE TO RELATED APPLICATION

The present invention claims the benefit of United Kingdom (GB) Patent Application Number 0216749.2, filed Jul. 18, 2002.

TECHNICAL FIELD

The present invention relates to brake rotors, and in particular to brake rotors for use on vehicles, especially road vehicles, and in particular heavy road vehicles such as trucks and lorries.

BACKGROUND OF THE INVENTION

Known brake rotors include a mounting flange having a plurality of circumferentially equally spaced mounting holes. The holes are used to fix the rotor to a wheel hub of the vehicle. The mounting flange includes a circular central hole which fits over various wheel hub components.

However in use, such known brake rotors can develop radial cracks between an inner edge of the mounting holes and the mounting flange central hole.

There is a desire is to produce a brake rotor which is less susceptible to developing such cracks.

SUMMARY OF THE INVENTION

Accordingly, the present invention is directed to a brake rotor having an annular disc connected to an annular mounting flange, the mounting flange defining a radially inner flange wall and including a plurality of circumferentially spaced mounting holes. The flange wall includes a plurality of recesses, with each recess situated circumferentially between adjacent mounting holes. The brake rotor also includes ventilation vanes between opposing braking faces of the annular disc with at least some ventilation vanes including inner vane portions which extend inwardly of a radially inner edge of the annular disc.

It has been found that by providing recesses between each mounting hole, the hoop stresses which develop in use due to differential thermal expansion of different parts of the brake rotor are reduced. In particular the thermal stresses in that part of the brake rotor immediately radially inside each mounting hole can be reduced to an extent such that cracks no longer form.

DESCRIPTION OF THE DRAWINGS

The invention will now be described, by way of example only, with reference to the accompanying drawings in which.

DETAILED DESCRIPTION OF THE PREFERRED EMBODIMENT

Figure 1:
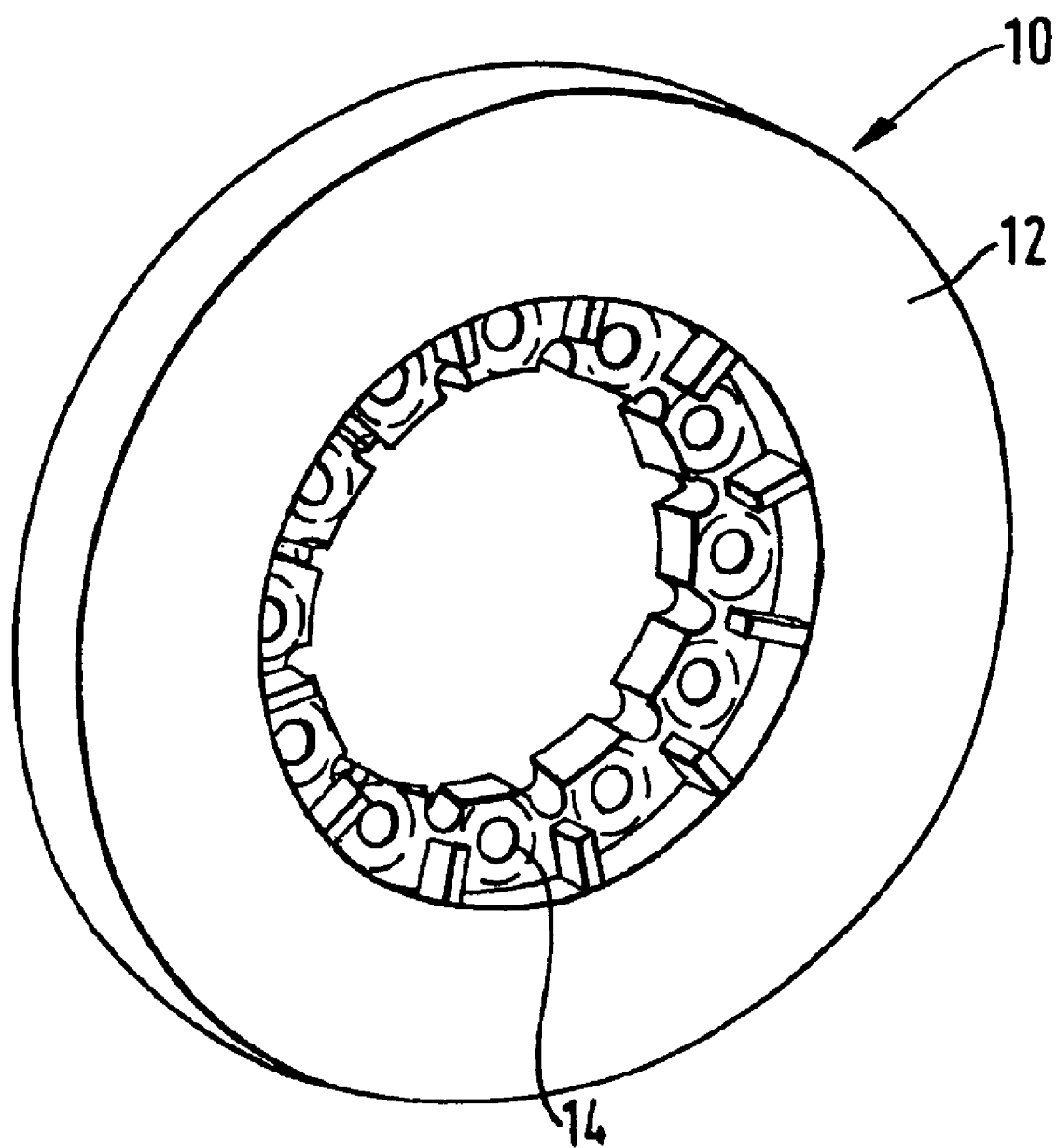
FIG. 1 is an isometric view of a brake rotor according to the present invention.

Specific measurements are used in the description below for illustrative purposes only and are not meant to be limiting in any way. With reference to the figures, there is shown a brake rotor 10 having an annular disc 12 connected to a generally annular mounting flange 14. In particular, it should be noted that the annular disc 12 is connected via an annular region 36. The annular region 36 is a continuous annular region. In this case, the annular region 36 is connected to a brake portion 17.

The annular disc 12 has brake portions 16 and 17, which are spaced apart by ventilation vanes 18. The brake portions 16 and 17 together with the ventilation vanes 18 define ventilation holes 20. The brake portions 16 and 17 define braking faces 16A and 17A respectively.

During use, the braking faces 16A and 17A rotate within a recess of a known caliper and are typically mounted on suspension components of a vehicle. Known brake pads are mounted within the caliper and are forced into frictional engagement with the braking faces 16A and 17A via a known mechanical/pneumatic/hydraulic system to provide a braking force.

The mounting flange 14 includes a plurality of mounting holes 22 (12 holes in this example). The mounting holes 22 are circumferentially and equidistantly spaced and have a pitch circle diameter of B (192 millimeters in this particular example).

The mounting holes 22 have a nominal diameter of 17 millimeters and thus inner edges of the mounting holes 22 define a circle of diameter C (175 millimeters in this example). The mounting flange 14 further defines a radially inner flange wall 24 in the form of an interrupted circle of diameter D (162 millimeters in this example).

The radially inner flange wall 24 is interrupted by axial recesses in the form of grooves 26 with each groove 26 being positioned circumferentially between adjacent mounting holes 22. Each groove 26 has a substantially semicircular radially outermost end 28 (FIG. 2A) with a center of the semicircle being indicated by reference numeral 30.

The centers 30 define a circle of diameter E (170 millimeters in this particular example). The radius of the semicircular radially outermost end 28 of the grooves is 7½ millimeters in this example, and thus the semicircular radially outermost ends 28 of the grooves 26 define a circle of diameter F (185 millimeters in this example). A radially innermost edge of brake portion 16 is positioned at a diameter G (234 millimeters in this example).

Figure 2:
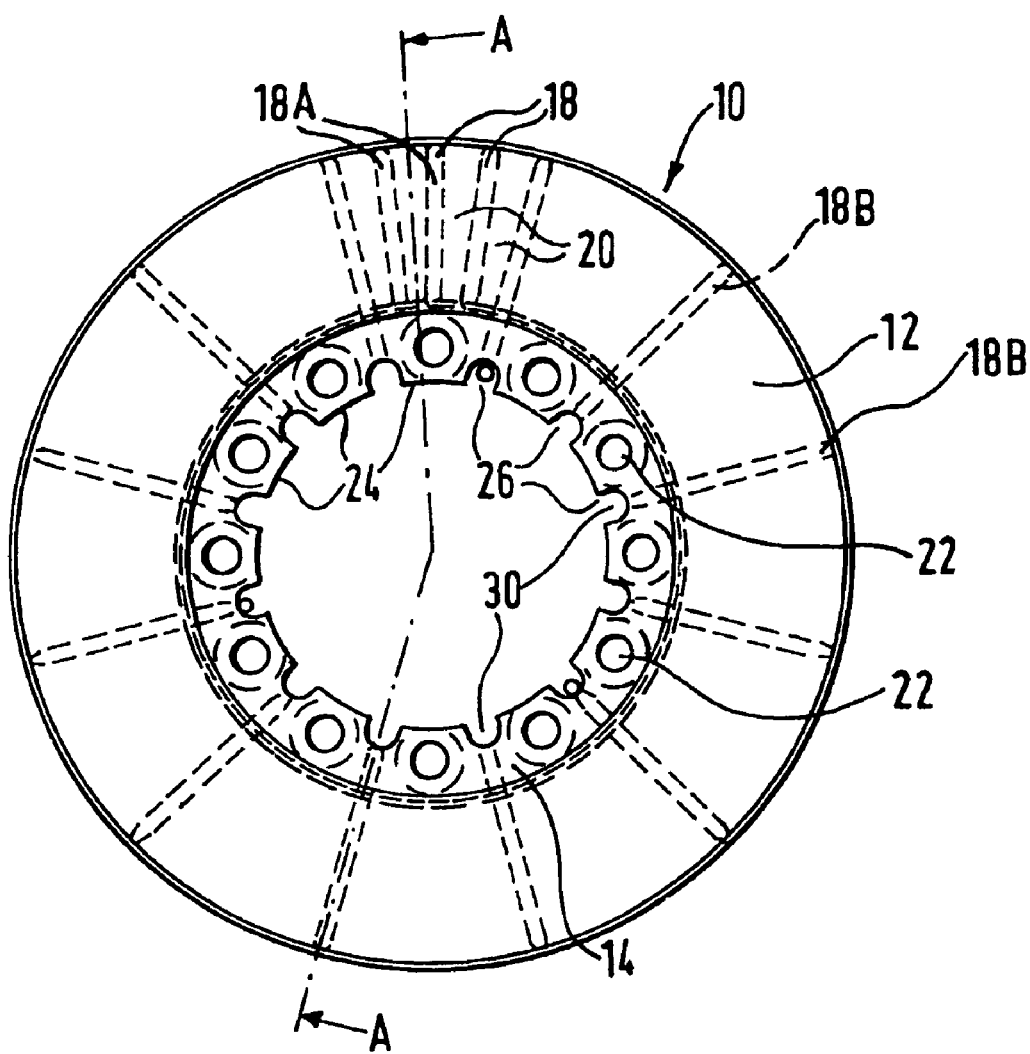
FIG. 2 is an axial view of the rotor of FIG. 1.
Figure 2A:
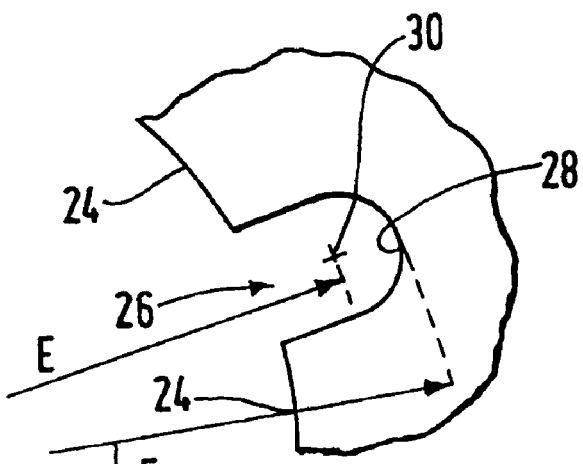
FIG. 2A is an enlarged view of FIG. 2.
Figure 3:
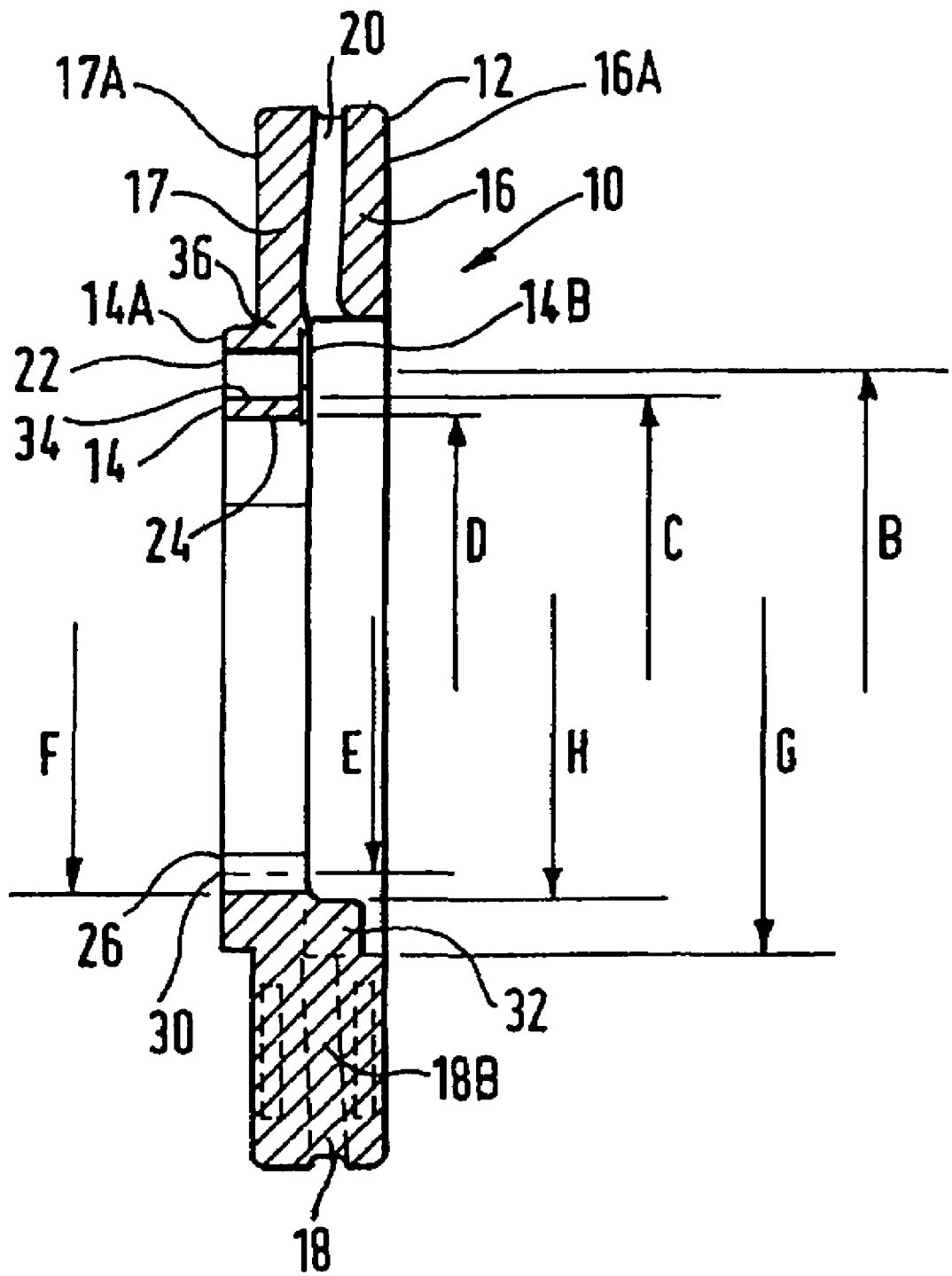
FIG. 3 is a cross section view of the rotor of FIG. 2 taken along the line A—A.

Examination of FIG. 2 and the upper half of FIG. 3 shows that certain ventilation vanes 18A extend radially inwardly only as far as the radially innermost edge of brake portion 16. However, examination of FIG. 2 and the lower part of FIG. 3 shows that certain other vanes 18B extend radially inwardly pass the radially innermost edge of brake portion 16 to a diameter H (approximately 192 millimeters in this example), thus forming an inner vane portion 32. It can be seen that inner vane portion 32 projects axially from the mounting flange 14. Furthermore, it would be appreciated that the vanes 18A are circumferentially aligned with an associated groove 26.

In this embodiment, the ventilation vanes 18 are all radially orientated. Note, however, that in further embodiments the ventilation vanes could be curved.

Consideration of FIG. 3 shows that the mounting flange 14 has axially outwardly oriented faces 14A and 14B. It would be appreciated that the mounting flange 14 is offset to the left relative to the annular disc 12 when viewing FIG. 3.

Furthermore, a plane defined by face 14B is situated between planes defined by braking faces 16A and 17. Thus mounting flange 14 is offset from, but nevertheless overlaps with, the annular disc 12.

It has been found that by providing the grooves 26 in the position as indicated, material 34 (see FIG. 3) situated between the mounting holes 22 and the radially inner flange wall 24 is subject to lower thermal stresses and hence the likelihood of cracking in this region is significantly reduced.

Certain aspects of the geometry of the mounting flange 14 should be noted. In this example, the mounting hole pitch circle diameter B (192 millimeters in this example) is larger than the groove end center pitch circle diameter E (170 millimeters in this example). Further, the mounting hole pitch circle diameter B (192 millimeters in this example) is larger than the groove radially outer edge circle diameter F (185 millimeters in this example). Also, the groove end center pitch circle diameter E (170 millimeters in this example) is less than the circle diameter C (175 millimeters in this example) defined by the radially innermost portion of the mounting holes 22.

The diameter of the circle F (185 millimeters in this example) defined by the groove radially outermost ends 28 is larger than the diameter of the circle C (175 millimeters in this example) defined by the radially innermost portion of the mounting holes 22.

The brake rotor 10, and the inner vane portions 32 in particular, are typically cast using any metal casting method. Although the grooves 26 may also be cast, machining the grooves 26 instead makes it easier to make the radially outer edge circle diameter F smaller than the circle H defined by the inner edge of the inner vane portions 32. This allows for machining of the rotor flange without requiring machining of the inner vane portions 32 as well.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A brake rotor, comprising:
   an annular disc defining an axis of rotation and having first and second brake portions, the first brake portion being connected to an annular mounting flange;
   a first radially inner flange wall defined by the annular mounting flange, the first radially inner flange wall having a plurality of circumferentially spaced mounting holes;
   a second radially inner flange wall defined by the second brake portion, the second radially inner flange wall being positioned further away from the axis of rotation than the first radially inner flange wall;
   a plurality of recesses in the first radially inner flange wall, each recess being disposed circumferentially between adjacent mounting holes; and
   a plurality of ventilation vanes positioned between the first and second brake portions, wherein at least one ventilation vane includes an inner vane portion extending inwardly of the second radially inner flange wall of the second brake portion.

2. The brake rotor as defined in claim 1, wherein the inner vane portion projects from the annular mounting flange.

3. The brake rotor as defined in claim 1, wherein the inner vane portion is substantially radially in line with a recess of the plurality of recesses.

4. The brake rotor as defined in claim 1, wherein a radially inner edge of the inner vane portion defines a circle having a diameter.

5. The brake rotor as defined in claim 4, wherein the plurality of recesses comprises a plurality of grooves wherein each groove has a radially outer edge defining a groove radially outer edge circle having a diameter that is less than the diameter of the circle defined by the radially inner edge of the inner vane portion.

6. The brake rotor as defined in claim 4, wherein the plurality of circumferentially spaced mounting holes defines a mounting hole pitch circle diameter that is substantially the same as the diameter of the circle defined by the radially inner edge of the inner vane portion.

7. The brake rotor as defined in claim 4, wherein the plurality of circumferentially spaced mounting holes has radially inner edges defining a mounting hole radially inner edge circle having a diameter that is less than the diameter of the circle defined by the radially inner edge of the inner vane portion.

8. The brake rotor as defined in claim 1, wherein each of the plurality of recesses is in the form of an axially oriented groove.

9. The brake rotor as defined in claim 8, wherein each axially oriented groove has a substantially semicircular radially outermost end, with each semicircular radially outermost end having a center that defines a groove end center pitch circle diameter.

10. The brake rotor as defined in claim 9, wherein the groove end center pitch circle diameter is less than a diameter of a circle defined by a radially inner edge of the inner vane portion.

11. The brake rotor as defined in claim 1, wherein the annular disc is axially offset relative to the annular mounting flange.

12. The brake rotor as defined in claim 11, wherein the annular disc axially overlaps the annular mounting flange.

13. The brake rotor as defined in claim 1 wherein the first brake portion is connected to the annular mounting flange by a continuous annular region.

14. The brake rotor as defined in claim 1 wherein the first and second brake portions, the annular mounting flange, and the plurality of ventilation vanes are all formed as a single unitary component.

15. A brake rotor, comprising:
    an annular disc having first and second brake portions, the first brake portion being connected to an annular mounting flange;
    a radially inner flange wall defined by the annular mounting flange, the radially inner flange wall having a plurality of circumferentially spaced mounting holes;
    a plurality of recesses in the radially inner flange wall, each recess being disposed circumferentially between adjacent mounting holes; and
    a plurality of ventilation vanes positioned between the first and second brake portions, wherein at least one ventilation vane includes an inner vane portion extending inwardly of a radially inner edge of the second brake portion wherein the inner vane portion axially overlaps the second brake portion.

16. A brake rotor, comprising:
    an annular mounting flange having a first radial inner wall surrounding an axis of rotation;
    a first brake portion connected to the annular mounting flange and defining a first braking surface;
    a second brake portion spaced apart from the first brake portion and defining a second braking surface facing opposite from the first braking surface, the second brake portion having a second radial inner wall positioned further away from the axis of rotation than the first radial inner wall;

a plurality of circumferentially spaced mounting holes formed within the annular mounting flange;

a plurality of recesses formed within the first radial inner wall wherein each recess is disposed circumferentially between adjacent mounting holes; and a plurality of ventilation vanes extending between the first and second brake portions wherein at least one ventilation vane has an inner vane portion that extends radially inwardly of the second radial inner wall.

17. The brake rotor as defined in claim 16, wherein at least one other ventilation vane extends radially inwardly only as far as the second radial inner wall.

18. The brake rotor as defined in claim 17, wherein the annular mounting flange is axially offset from the second brake portion along the axis of rotation.

* * * * *